United States Patent Office 3,799,772
Patented Mar. 26, 1974

3,799,772
SILVER-CADMIUM OXIDE TYPE MATERIAL
Edward J. Zdanuk, deceased, by Theresa R. Zdanuk, administratrix, Burlington, Richard H. Krock, Weston, and Yuan Shou Shen, Reading, Mass., assignors to P. R. Mallory & Co. Inc., Indianapolis, Ind.
Filed Feb. 4, 1972, Ser. No. 223,525
Int. Cl. C22c 5/00
U.S. Cl. 75—173 A    15 Claims

ABSTRACT OF THE DISCLOSURE

Improved properties including reduced arc erosion rate are obtained in silver-cadmium oxide materials by adding at least one additive selected from the group consisting of niobium and manganese metals in an amount from 0.001 up to 5%, and optionally tin.

BACKGROUND

Up to the present time one of the most commercial electrical contact materials is silver-cadmium oxide in accordance with the teachings of U.S. Pat. 2,539,298, issued July 28, 1945, to Arnold S. Doty. However, the arc erosion rate of this material is not as low as desired. It is desirable that the electrical conductivity of the material not be substantially reduced in an effort to reduce the arc erosion rate. Furthermore, it is desirable to discover new benefits in the properties of silver-cadmium materials with a view to obtaining new applications for this material.

In application Ser. No. 88,620, filed Nov. 12, 1970, now U.S. Pat. 3,694,197, dated Sept. 26, 1972, certain additives are disclosed and claimed which result in improved properties in electrical contact applications, including reduced arc erosion rate.

OBJECTS

It is therefore a first object of the present invention to reduce the arc erosion rate of silver-cadmium oxide type electrical contact material.

It is another object of the present invention to reduce the erosion rates without substantially reducing the electrical conductivity of the material.

Another object of the present invention is to increase the rate of internal oxidation of the cadmium so that lesser processing times are required.

Another object of the present invention is to produce a finer silver-cadmium oxide microstructure.

Another object of the present invention is to prevent oxide precipitation along the grain boundaries which embrittles the silver matrix.

Another object of the present invention is to provide additional additives which improve the properties of electrical contact material, particularly that lower arc erosion rate.

Other objects will be apparent from the following description and drawings.

DRAWINGS

SUMMARY OF THE INVENTION

The present invention involves addition to silver-cadmium oxide type materials of at least one of the following additives in an amount of from 0.001% up to about 5% of niobium and manganese, the material being oxidized to convert oxidizable constituents of the material to their respective oxides prior to use as an electrical contact material. The additions may be made alone or in combination with each other. Tin in the range of 0.001% to about 5% is a particularly effective second addition. Often only a single addition is necessary to obtain improved properties, but the addition of two or more additives is often useful in particular applications.

DETAILED DESCRIPTION

The cadmium content of the materials of the present invention can vary from about 1 up to about 30% by weight cadmium. The effect of increased amounts of cadmium is shown in the following table.

Preferably, cadmium is present up to 25% by weight and most preferably up to 15% by weight.

TABLE I
[Effects of Cd on the properties of silver]

| Material, w/o Ag | CdO, w/o | CdO, v/o | Percent IACS | Electrical conductivity percent of Ag |
|---|---|---|---|---|
| 100 | 0 | 0 | 108 | 100 |
| 90 | 10 | 12.6 | 75 | 69 |
| 85 | 15 | 18.6 | 65 | 60 |
| 80 | 20 | 23 | 55 | 50 |

Considering now the additives one by one, a particularly effective additive is niobium. When niobium is used alone, it should preferably be in an amount of about 0.001 to about 0.5% by weight most preferably from about 0.01% to about 0.3% by weight. Cadmium is preferably not more than about 20%. The arc erosion rate of niobium containing silver-cadmium oxide type materials is below 1.5 milligrams per kilocycle of operation and is often as low as 1.02 milligrams per kilocycle and lower compared to about 1.7 milligrams per kilocycle for material without niobium addition.

A particularly interesting advantage of a niobium addition is that it somewhat increases the rate of internal oxidation of the basic silver-cadmium material. Thus, either lower temperature and/or less time at the same temperature may be utilized for internal oxidation with niobium additives.

Figure 3:
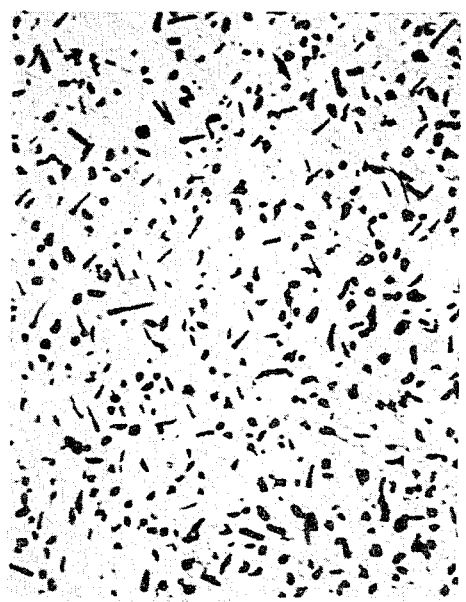
FIG. 3 is a view of the microstructure of a 0.30% by weight manganese containing silver-9% cadmium oxide material at 545X.
Figure 4:
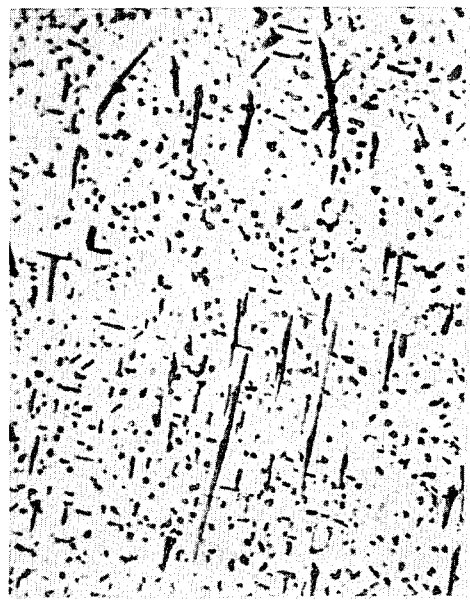
FIG. 4 is a view of the microstructure of a 0.1% by weight tin containing silver-9% cadmium oxide material at 545X.

Another additive which may be utilized in accordance with the present invention is manganese. Manganese is preferably in an amount of from 0.05 to 3%, most preferably, 0.1 to 2%. Cadmium is preferably not more than about 25%. Manganese tends to form divorced grain boundaries which can improve the fabricability of the material as shown in FIG. 3. Manganese appears to increase the rate of internal oxidation.

As mentioned previously, combinations of additives may also be utilized. Two or more additives may be used, as desired, in order to obtain desired properties. Often, however, two additives are sufficient to obtain desired properties. However, a particularly effective additional additive which may be utilized in accordance with the present invention is tin. Tin is preferably utilized in the amount of about 0.05 to about 3%. Most preferably, the tin content is from about 0.12 to about 2%. If tin is added, cadmium should preferably not be above about 25 weight percent. Furthermore, tin may partially substitute for cadmium up to about 5% tin. A tin addition tends to result in cadmium oxide precipitating in a spike-like-shape, as is indicated in FIG. 6. With a tin addition the arc erosion rate is generally below 1.4 milligrams per kilocycle and is often as low at 1.36 and lower. Tin additions below about 0.5% show some tendency to increase the rate of internal oxidation.

Niobium, which shows some reduction in erosion rate, imparts increase in oxidation rate. Manganese is associated with high oxidation rates and particle refinement. Combinations of additives can also be made on the basis of mechanical properties such as strength and/or ductility, in addition to reducton of arc erosion rate and increased oxidation rate.

EXAMPLE I

Silver and 9% cadmium and 0.05% niobium as additive were melted and cast to form an ingot. The ingot was then rolled to a slab of ⅛-inch thickness. Slugs with the configuration of an electrical contact are punched from the slab in the form of ⅜″ diameter, right circular cylinder of height ⅛″.

These slugs are oxidized at 800° C. for 96 hours in air.

Figure 1:
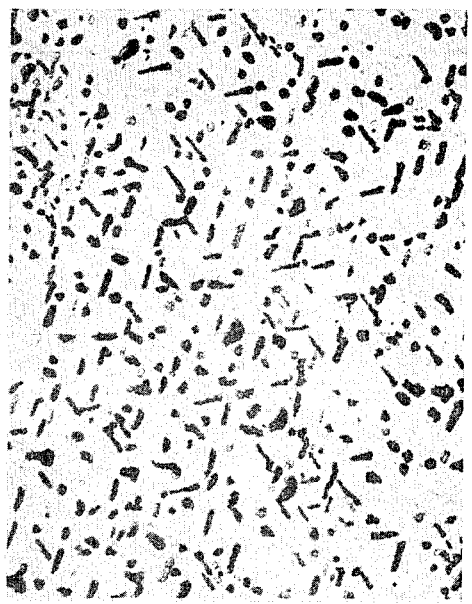
FIG. 1 is a view of the microstructure of a standard silver-9% cadmium oxide material without additives at 545X.
Figure 2:
FIG. 2 is a view of the microstructure of a 0.05 weight niobium containing silver-9% cadmium oxide material at 545X.

The microstructure of the oxidized slug is shown in FIG. 2.

The material with niobium (0.05 wt. percent) additive was tested under the condition: 215-V, 150-A A.C. with power factor of 45-55%, with duty cycle of ½ sec. on, ⁶⁄₇ sec. off, its arc erosion rate (weight loss) was 1.02 milligram per kilocycle of operation (mg./kc.), while the arc erosion rate of the straight Ag-CdO material tested under the same conditions was 1.65 mg./kc.

The case thickness of the contact made from the Ag-9 Cd-0.05 Nb alloy after 96 hours oxidation at 800° C. was found to be 1.23 millimeter while the case thickness of straight Ag-9 Cd alloy was found to be 1.14 mm. only.

On a volume percent basis for Ag-CdO bodies a limitation due to decreased electrical conductivity is to be expected and may be seen from Table II.

Additional results are found in Table II.

EXAMPLE II

Example 1 was repeated except 0.3% Mn was used instead of 0.05% Nb.

The erosion rate of the contacts made from oxidized Ag-9Cd alloy with 0.1 Mn was 1.09 mg./kc. Manganese as additive in the alloy also tends to form divorced grain boundaries which can increase the fabricability of the material and can also reduce the particle size greatly as can be seen from FIG. 3. Additional data is shown in Table II.

TABLE II
[Effect of additive on the Ag-CdO material]

| Example number | Alloy additive, percent | Estimate of relative average CdO particle size | Erosion rate, mg./kc. | Case depth mm. at 96 hrs./800° C. | Conductivity IACS, percent |
|---|---|---|---|---|---|
| I Nb | Basic 0.05 | 1.00 1.00 | 1.65 1.02 | 1.14 1.23 | 75 80 |
| III Mn | 0.3 | 0.20 | 1.37 | 1.36 | 74 |

NOTE.—All percentages recited herein are weight percentages.

What is claimed is:

1. Ag-CdO type electrical contact material having a reduced erosion rate, the material consisting essentially of an effective amount up to about 30 wt. percent Cd, about 0.001 to about 5 wt. percent of an additive selected from Nb, Mn or mixtures thereof, the balance Ag, the material being oxidized to convert oxidizable constituents to their respective oxides prior to use as an electrical contact material.

2. The Ag-CdO type electrical contact material of claim 1, wherein Cd is an effective amount up to about 15 wt. percent and the additive is about 0.001 to about 0.5 Nb.

3. The Ag-CdO type electrical contact material of claim 1, wherein Cd is an effective amount up to about 15 wt. percent and the additive is about 0.05 to about 3 wt. percent Mn.

4. Ag-CdO type electrical contact material having a reduced erosion rate, the material consisting essentially of an effective amount up to about 30 wt. percent Cd, an effective amount up to about 5 wt. percent Sn, about 0.001 to about 5 wt. percent of an additive selected from Nb, Mn or mixtures thereof, the balance Ag, the material being oxidized to convert oxidizable constituents to their respective oxides prior to use as an electrical contact material.

5. The Ag-CdO type electrical contact material of claim 4, wherein the Sn is about 0.05 to about 3 wt. percent.

6. The Ag-CdO type electrical contact material of claim 5, wherein the additive is about 0.001 to about 0.5 wt. percent Nb.

7. The Ag-CdO type electrical contact material of claim 5, wherein the additive is about 0.05 to about 3 wt. percent Mn.

8. The Ag-CdO type electrical contact material of claim 3 further including an effective amount up to about 2 wt. percent Ni.

9. The Ag-CdO type electrical contact material of claim 3 further including an effective amount up to about 5 wt. percent Fe.

10. Ag-CdO type electrical contact material having a reduced erosion rate, the material consisting essentially of an effective amount up to about 25 wt. percent Cd, an effective amount of up to about 2 wt. percent Sn, about 0.001 to about 2 wt. percent of an additive selected from Nb, Mn or mixtures thereof, the balance Ag, the material being oxidized to convert oxidizable constituents to their respective oxides prior to use as an electrical contact material.

11. The Ag-CdO type material of claim 10, wherein the additive is about 0.01 to about 0.3 wt. percent Nb.

12. The Ag-CdO type material of claim 10, wherein the additive is about 0.1 to 2 wt. percent Mn.

13. In a method of making the Ag-CdO type electrical contact material of claim 1 comprising the steps of providing a melt of Ag-Cd and an additive selected from Nb, Mn or mixtures thereof to form a body consisting essentially of an effective amount up to about 30 wt. percent Cd, about 0.001 to about 5 wt. percent of the additive, the balance Ag, and subjecting the body to oxidation to convert oxidizable constituents to their respective oxides.

14. In a method of making the Ag-CdO type electrical contact material of claim 4 comprising the steps of providing a melt of Ag-Cd-Sn and an additive selected from Nb, Mn or mixtures thereof to form a body consisting essentially of an effective amount up to about 30 wt. percent Cd, an effective amount up to about 5 wt. percent Sn, about 0.001 to about 5 wt. percent of an additive selected from Nb, Mn or mixtures thereof, and subjecting the body to oxidation to convert oxidizable constituents to their respective oxides.

15. In a method of making the Ag-CdO type electrical contact material of claim 10 comprising the steps of providing a melt of Ag-Cd-Sn and an additive selected from Nb, Mn or mixtures thereof to form a body consisting essentially of an effective amount up to about 25 wt. percent Cd, an effective amount up to 2 wt. percent Sn, about 0.001 to 2 wt. percent of an additive selected from Nb, Mn or mixtures thereof the balance Ag, and subjecting the body to oxidation to convert the oxidizable constituents to their respective oxides.

References Cited

UNITED STATES PATENTS 3,607,244 9/1971 Kabayama et al. ___ 75—173 R

FOREIGN PATENTS

| 15,619 | 5/1967 | Japan | 75—173 R |
| 960,592 | 6/1964 | Great Britain | 75—173 R |
| 1,090,484 | 10/1960 | Germany | 75—173 R |
| 1,153,178 | 8/1963 | Germany | 75—173 R |

L. DEWAYNE RUTLEDGE, Primary Examiner

E. L. WEISE, Assistant Examiner

UNITED STATES PATENT OFFICE
CERTIFICATE OF CORRECTION

Patent No. 3,799,772           Dated 03/26/74

Inventor(s) R. H. Krock

It is certified that error appears in the above-identified patent and that said Letters Patent are hereby corrected as shown below:

Col. 3 line 5, Insert "which" after Manganese

Col. 3 line 52 In table II delete-- . --- after mm
Insert --@ after mm---

Signed and sealed this 1st day of October 1974.

(SEAL)
Attest:

McCOY M. GIBSON JR.          C. MARSHALL DANN
Attesting Officer             Commissioner of Patents